(12) United States Patent
Wolfram et al.

(10) Patent No.: US 10,034,031 B2
(45) Date of Patent: Jul. 24, 2018

(54) GENERATING A SINGLE CONTENT ENTITY TO MANAGE MULTIPLE BITRATE ENCODINGS FOR MULTIPLE CONTENT CONSUMPTION PLATFORMS

(71) Applicant: Adobe Systems Incorporated, San Jose, CA (US)

(72) Inventors: Herbert Wolfram, San Rafael, CA (US); Venkatesh Kumar, Fremont, CA (US); Christopher Samaniego, San Rafael, CA (US); Mark B. Howard, San Francisco, CA (US); Bennie N. Boone, II, Elk Grove, CA (US); Jennifer A. J. Jolliffe, West Bloomfield, MI (US)

(73) Assignee: Adobe Systems Incorporated, San Jose, CA (US)

( * ) Notice: Subject to any disclaimer, the term of this patent is extended or adjusted under 35 U.S.C. 154(b) by 881 days.

(21) Appl. No.: 13/646,490

(22) Filed: Oct. 5, 2012

(65) Prior Publication Data

US 2014/0098850 A1 Apr. 10, 2014

(51) Int. Cl.
*H04N 7/12* (2006.01)
*H04N 21/2343* (2011.01)
(Continued)

(52) U.S. Cl.
CPC ... *H04N 21/23439* (2013.01); *H04N 21/8352* (2013.01); *H04N 21/8543* (2013.01)

(58) Field of Classification Search
CPC ..... H04L 65/60; H04L 65/601; H04L 65/602; H04N 21/2343; H04N 21/2355;
(Continued)

(56) References Cited

U.S. PATENT DOCUMENTS 7,818,444 B2 * 10/2010 Brueck et al. ............... 709/231
8,205,004 B1 6/2012 Kaufman et al.
(Continued)

OTHER PUBLICATIONS

Wowza Media Systems, Inc., "Wowza Media Server 3: User's Guide," pp. 1-91, Mar. 29, 2012, available at http://www.wowza.com/resources, 2006-2012 copyright Wowza Media Systems, LLC.
(Continued)

*Primary Examiner* — Francis G Geroleo
(74) *Attorney, Agent, or Firm* — Kilpatrick Townsend & Stockton LLP

(57) ABSTRACT

A content management system may generate a single content entity to manage multiple bitrate encodings for multiple content consumption platforms. A content management system may receive master content from a content creator/provider. Multiple bitrate encodings of the master content may be generated for consumption on multiple content consumption platforms. A single content entity identifier may be created to identify as a single content entity the generated bitrate encodings. The single content entity may be published to a content delivery system. The content delivery system may receive requests from content consumption devices for the content entity. A content delivery system may dynamically generate a content manifest to be sent to the content consumption device for use in streaming the content entity.

17 Claims, 9 Drawing Sheets

(51) Int. Cl.
*H04N 21/8352* (2011.01)
*H04N 21/8543* (2011.01)

(58) Field of Classification Search
CPC ............ H04N 19/40; H04N 21/23439; H04N 21/8543; H04N 21/8352
USPC ...................................... 375/240.01; 709/231
See application file for complete search history.

(56) References Cited

U.S. PATENT DOCUMENTS

| | | | |
|---|---|---|---|
| 8,234,350 B1* | 7/2012 | Gu et al. | 709/217 |
| 2006/0242275 A1* | 10/2006 | Shapiro | 709/220 |
| 2011/0035507 A1 | 2/2011 | Brueck et al. | |
| 2011/0154409 A1* | 6/2011 | Rhee et al. | 725/62 |
| 2011/0161485 A1 | 6/2011 | George et al. | |
| 2011/0305273 A1 | 12/2011 | He et al. | |
| 2011/0310216 A1 | 12/2011 | Lee et al. | |
| 2012/0198506 A1* | 8/2012 | Joe et al. | 725/97 |
| 2013/0145411 A1* | 6/2013 | Major et al. | 725/109 |
| 2013/0145415 A1* | 6/2013 | Major et al. | 725/110 |

OTHER PUBLICATIONS

Wowza Media Systems, Wowza Media Server 3, "Wowza Transcoder AddOn Users Guide, Verstuib 3.1" pp. 1-21, Mar. 29, 2012, available at http://www.wowza.com/resources, 2006-2012 copyright Wowza Media Systems, LLC.

"Streaming Media, Using Adobe Flash Media Server to Deliver Live and On-Demand Video," pp. 1-50, Nov. 8, 2011, available at http://www.streamingmedia.com/Conferences/West2011/docs/SMWest2011-AdobeWorkshop.pdf.

Kaltura Inc., "Best Practices for Multi-Device Transcoding," David P. Kronmiller, pp. 1-21, Oct. 1, 2012, available at http://knowledge.kaltura.com/sites/default/files/Best%20Practices%20for%20MultiDeviceTranscoding.pdf.

* cited by examiner

GENERATING A SINGLE CONTENT ENTITY TO MANAGE MULTIPLE BITRATE ENCODINGS FOR MULTIPLE CONTENT CONSUMPTION PLATFORMS

BACKGROUND

Traditional forms of content distribution are receding before increasing consumer demand for a multitude of varied and swiftly changing technologies. Content, such as audio, video, or the written word, is no longer restricted to the distribution channels of the television, radio, or printed page. Instead, a whole new range of devices, from mobile phones to portable computers are capable of viewing, playing, displaying, or otherwise consuming content. Wired or wireless networks broaden the reach and accessibility of content for these new devices. In order to exploit the greater audience now available, content creators and providers must continually respond to the changing ways in which devices obtain and consume content.

For some content creators/providers, inefficiencies arise when attempting to distribute content to a wide variety of devices. For example, a network-based e-commerce site may wish to provide product videos for products offered for sale. To increase product sales, the site may wish to provide product videos viewable on several different devices. However, as changes are made to product videos themselves or as new viewing devices or viewing formats are developed, the site may have to maintain several different versions of what is essentially the same product video. The cost of maintaining video versions for a large number of product videos may discourage content creators and providers, such as the network-based e-commerce site, to adopt new content distribution technologies or methods. Similarly, the adoption or development new content consumption devices or technologies may be discouraged in face of the challenge of supporting these new devices or technologies.

SUMMARY

Various embodiments of generating a single content entity to manage multiple bitrate encodings for multiple content consumption platforms are described. As part of a content management service, embodiments may include a content management system configured to manage multiple different bitrate encodings of received master content by creating a single content entity identifier. This identifier may identify these different bitrate encodings as a single content entity. The content entity may then be published to a content delivery system. Also part of a content management service, embodiments may include a content delivery system configured to handle requests from multiple content consumption devices implementing content consumption platforms for a content entity and dynamically generating a content manifest dependent on the format of the content consumption platform. A content consumption platform on a content consumption device may then request and receive content based on the generated content manifest.

DETAILED DESCRIPTION OF EMBODIMENTS

Figure 1:
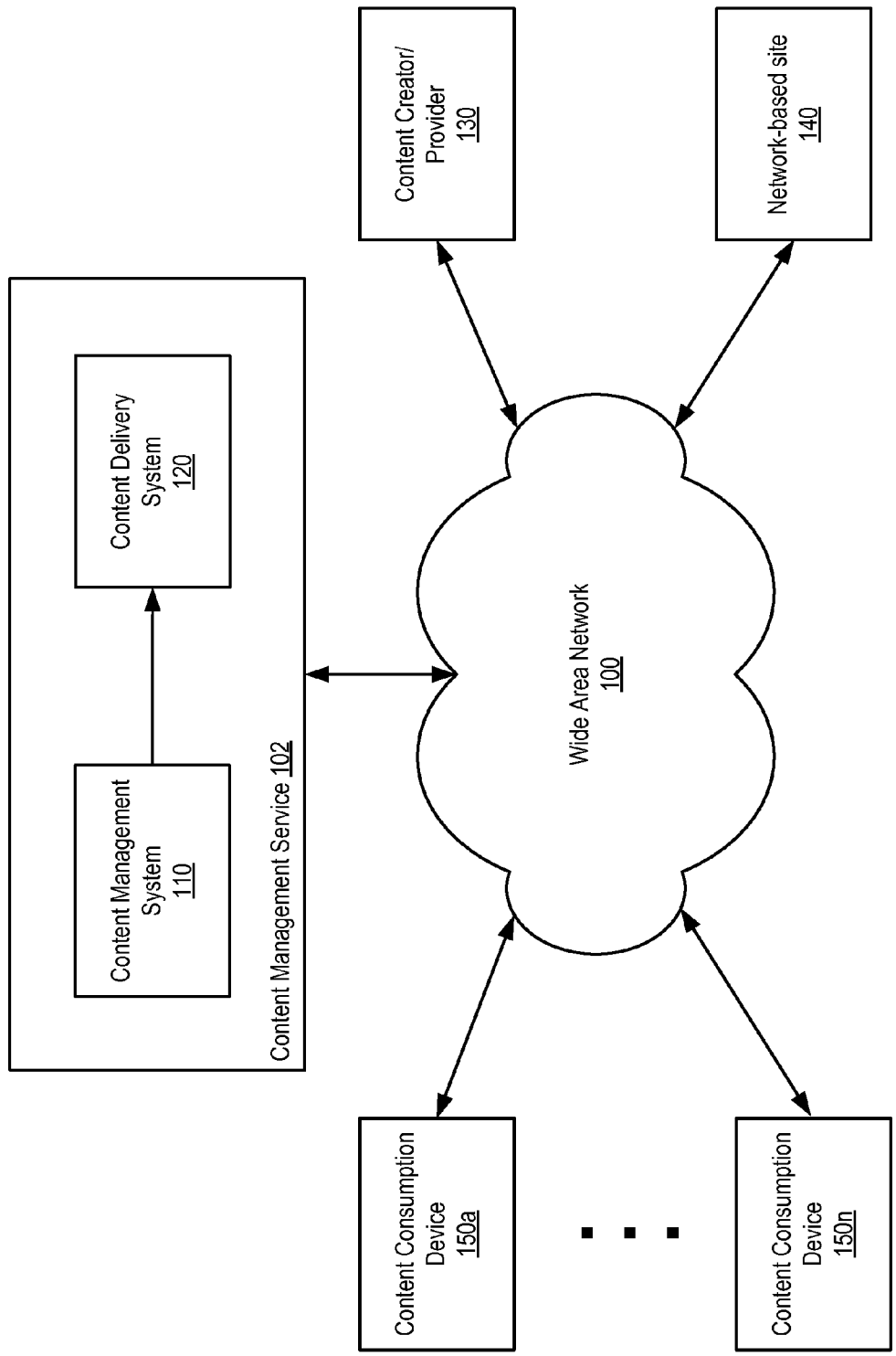
FIG. 1 illustrates a content management service operating environment, according to some embodiments.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that are not described in detail below because they are known by one of ordinary skill in the art in order not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of generating a single content entity to manage multiple bitrate encodings for multiple content consumption platforms are described herein. A content management system or digital asset management system may receive content, such as one or more media files. The content management system may encode the content into multiple different bitrates formatted for different devices that playback content at multiple bitrates. The encodings may then be associated with a single set identifier. The encodings and the set identifier may be published to one or more content delivery networks. A playback device may request the content by requesting the single content identifier from a content delivery network. In response to the request, the content delivery network may then deliver the content at multiple bitrates to the requesting playback device formatted for the device.

A content management service, such as content management service 102 described below with regard to FIG. 1, may implement generating a single content entity to manage multiple bitrate encodings of content. Content may be stored in a content management service in multiple bitrate encodings in order to be accessible to many different content consumption platforms and devices. A content management service may, utilizing various embodiments, generate a single content entity to manage, track, and update the encodings of stored content. In some embodiments, the content management system may provide a user interface, such as a network-based interface (e.g., a web site) or client-based interface running on a client device, to manage the encodings in the single content entity.

A content creator/provider may upload content, referred to as master content, to a content management service for distribution to content consumption devices. The content management service may allow a content creator/provider to specify various specific bitrate encodings of content, such as different bitrates, formats, sizes, and resolutions. The content management service also allow a content creator to update or change (e.g., add to or delete) the master content or various encodings. In response to such an update or change, the content management service may ensure that the update is applied to the various encodings identified as included in the single content entity.

In some embodiments, within a content management service, a content management system may receive master content from a content creator/provider, generate the various encodings of the master content, and create a single content entity identifier to identify the various encodings of the master content as a single content entity. The content management system may then publish (e.g., send) the single content entity to a content delivery system, which may also be within the content management service. Embodiments of the content delivery system may receive requests from content consumption platforms or devices for the single content entity. These requests may include specific format information, or other information, which the content delivery system may use in responding to the request. In some embodiments, the content delivery system may provide a dynamically generated content manifest to the requesting device which may provide further instructions for the device to obtain the requested content. Based on these instructions, a requesting device or platform may generate further requests to an appropriate content delivery system server, such as a content streaming server, to deliver the content.

A content delivery system may, in some embodiments, have access to information concerning the single content entity, such as the various bitrates, formats, sizes and/or resolutions of encodings identified as part of the content entity. A content request handling server, which in at least some embodiments may be a part of a content delivery system, may access this information (which also may be referred to as metadata) to determine which encodings and what information to include in a content manifest. Moreover, different methods and techniques may be implemented to select encodings based on this and other information in the content request.

Embodiments of generating a single content entity to manage multiple bitrate encodings for multiple content consumption platforms may be implemented in any system or application that supports managing content to be distributed to content consumption devices. An example category of application in which embodiments may be implemented is digital asset management systems, media server software, such as image server software, digital rights management systems, or more generally in applications in which content may be distributed over wired or wireless networks. Embodiments of generating a single content entity to manage multiple bitrate encodings for multiple content consumption platforms may, for example, be implemented as a module of a larger content management application. Specific examples of applications or technologies in which embodiments may be implemented include, but are not limited to, Adobe® Scene7® technology, Adobe® Flash® technology, Adobe® Flash® Media Streaming Server technology, and Adobe® Media Server technology. "Adobe", and "Flash" are either registered trademarks or trademarks of Adobe Systems Incorporated in the United States and/or other countries.

Figure 9:
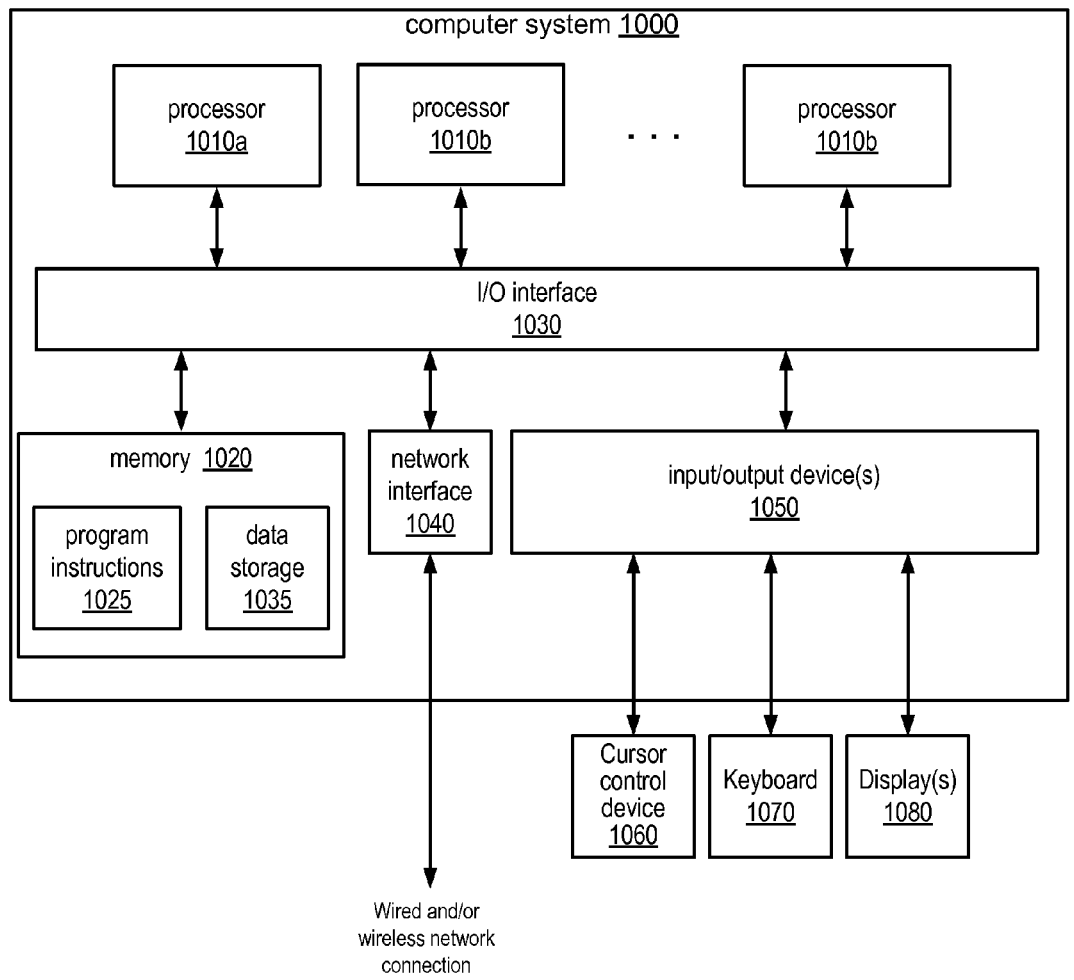
FIG. 9 illustrates an example computer system, according to some embodiments.

Embodiments of generating a single content entity to manage multiple bitrate encodings for multiple content consumption platforms may be implemented and performed by a module or modules implemented by program instructions stored in a computer-readable storage medium and executable by one or more processors (e.g., one or more CPUs and/or GPUs). An example computer system on which embodiments may be implemented is illustrated in FIG. 9.

Content Management Service Operating Environment

In various embodiments, a content management service may implement generating a single content entity to manage multiple bitrate encodings for multiple content consumption platforms and devices. FIG. 1, illustrates an example operating environment for a content management service, according to some embodiments. A content management service 102 may communicate with other systems, devices, or entities through a variety of communication systems and protocols, such as wired or wireless networks to receive and distribute content. In some embodiments, a wide area network 100, such as the Internet, may facilitate communications between a content management service 102 and other systems, devices, or entities.

A content creator/provider 130 may create, generate, and/or otherwise provide content. Generally, content may be various forms of distributable media such as audio, video, documents, or applications. In some embodiments, content may be generated using adaptive bitrate techniques, such as multi-bitrate sets. Multi-bitrate video sets may be utilized by content management services, content delivery services, or content providers to allow content consumption platforms, such as a streaming video player, to request video content at varying bitrates according to the transportation speed (e.g., download or network speed) and various other factors affecting processing speed. To provide varying bitrates, a set of encodings of the video content may be created by an encoder, such as content encoder 330 described below with respect to FIG. 3, as one multi-bitrate set of the video content. Adaptive techniques and sets, however, are not limited to video content and may be created or distributed for other types of media, such as audio content.

In addition to various bitrate encodings of content, content encodings may also be created according to various content formats. Some content consumption platforms may be limited to processing content in one format. For example, some content consumption platforms may only be capable of processing and displaying video content in the Adobe® Flash® format, while other content consumption platforms may only process HTTP Live streaming. Content consumption platforms exist currently, or may come into existence, capable of processing multiple content formats. For example, some audio content consumption platforms may process both Waveform Audio File Format (WAV) and MP3 format content. Content encodings may also be created for various other consumption factors, such as size or resolution. For example, video content or application content may be displayed at varying display sizes and resolutions and, as a result, multiple encodings of varying display sizes and resolutions may be created.

For example, in some embodiments, content may be video content, such as a product demonstration video, that a content creator/provider 130 may wish to distribute to content consumption devices 150. A creator may via a network-based site 140, such as an e-commerce site, wish to provide product information and receive purchase orders from customers. As part of the product information, a content creator/provider 130 may wish to distribute video content for consumption on a variety of content consumption platforms which may be implemented on a variety of content consumption devices, such as content consumption devices 150a-150n. In order to accomplish a wide distribution, the content creator/provider 130 may upload or send the product video content to a content management service 102.

A content creator/provider 130 may interact with a content management service 102 through a user interface. In some embodiments, a user interface may be implemented as a network-based site. A content creator/provider client device 130 may be implemented on a computer system, such as described below with regard to FIG. 9. The client device may implement an application, such as a web browser, capable of interacting with the network-based interface of the content management service 102. Various common user interface elements, such as drop down menus, lists, buttons, pop-up windows, directory trees, and graphic images as well as many others are well-known to those in the art, and any combination of them may be used to implement a network-based interface. Similarly, a client-based user interface, such as locally installed software application, may be implemented on a content creator/provider client device 130 to interact with a content management service 102 over wide area network 100. Such an application may implement various customized protocols or APIs to access one or more systems within the content management service 102. Such techniques are well-known to those in the art and need not be described here so as not to obscure the subject matter.

A wide area network 100, such as the internet, may, in some embodiments, provide a communication channel between a content creator/provider 130 and a content management service 102. Many techniques for communicating across such a network 100 may be implemented, such as Hypertext Transfer Protocol (HTTP) or File Transfer Protocol (FTP), are well-known to those in skilled in the art. For example, a content management service 102 may provide content creator/provider 130 with access to utilize an HTTP or FTP mechanism to upload content to the content management service 102. Other private networks, communication channels, or customized protocols may provide communication between a content creator/provider 130 and a content management service 102, and therefore the wide area network 100 illustrated in FIG. 1 need not be limiting as to other possible communication channels.

A content management service 102 may, in some embodiments, be implemented on multiple systems or devices, such as one or more computer systems or servers networked together. FIG. 9 illustrates an example of a computer system that may be used to implement one or more, or part of one or more, systems of a content management service 102. A content management system 110 may be included in a content management service 102. Generally, a content management system may allow one or more other systems or entities, such as a content creator/provider client device 130 to manage content located within the content management service 102 via accessing or interacting with a content management system 110. As discussed above, the content management system 110 may be accessed through a network-based or other form of user interface that may be implemented on the same or another system implementing a content management system 110. Master content may be received at the content management system 110 from a content creator/provider 130 over wide area network 100. The content management system 110 may generate multiple bitrate encodings of the content for different formats, bitrates, sizes, and resolutions. Then, the content management system 110 may create a single entity content identifier, such as a location value or database record, which lists or identifies all of the encodings included in the content entity. Various embodiments of a content management system 110 are discussed in more detail below with regard to FIGS. 3-5.

A content management system 110 may, in various embodiments, publish (e.g., send, transfer, or transport) a content entity to a content delivery system 120. A content management system 110 may publish other information, changes, or updates to a content delivery system. For example, if a content creator/provider client device 130 updates or changes a content entity, a content management system 110 may publish the updated encodings to a content delivery system 120. In some embodiments, a content management system 110 may publish information to separate subsystems, servers, or devices within a content delivery system 120. A content management system 110 may also provide a network-based address link (e.g., a URL) to a content creator/provider client device 130.

Figure 6:
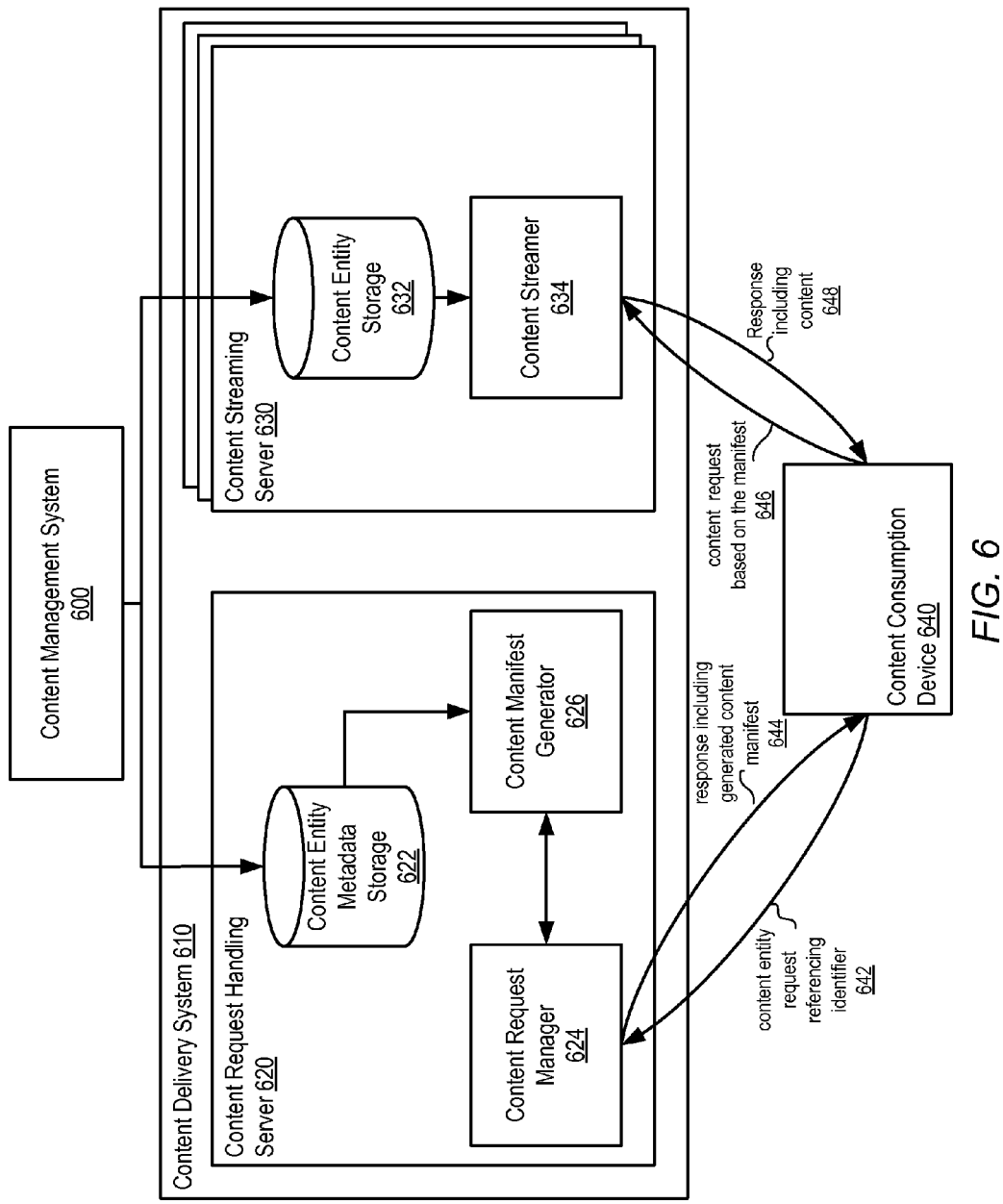
FIG. 6 illustrates a content delivery system, according to some embodiments.
Figure 7:
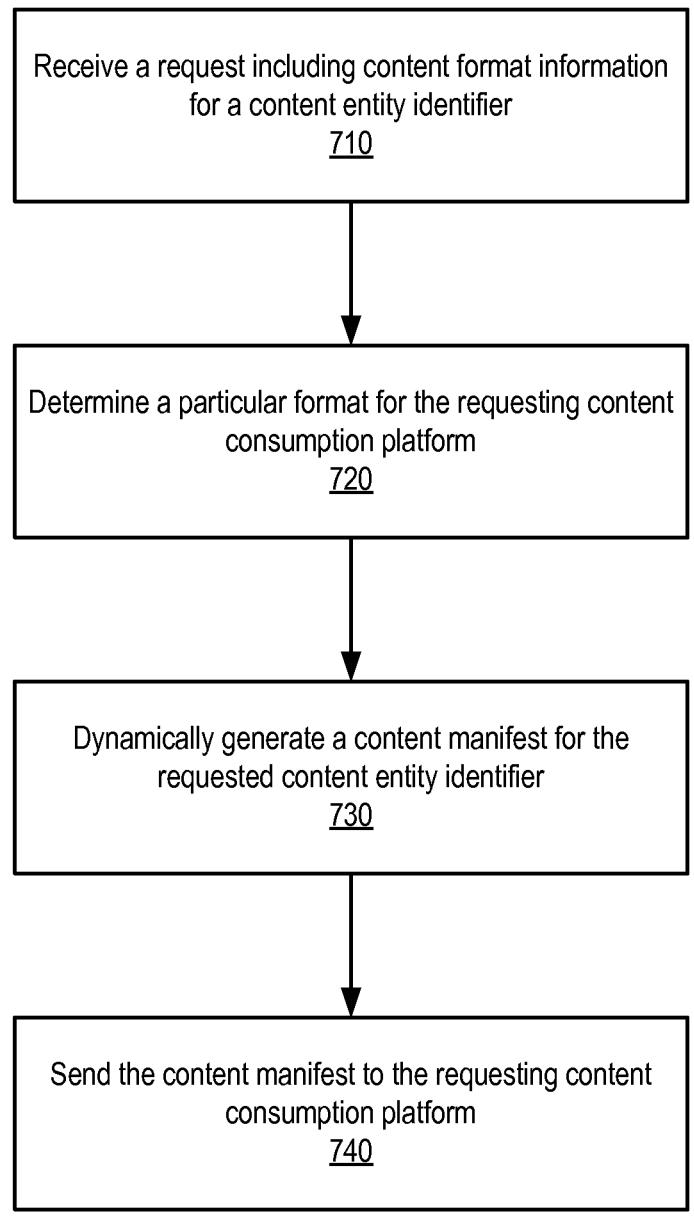
FIG. 7 illustrates a workflow of a method to dynamically generate a content manifest for a requesting content consumption platform, according to some embodiments.

A content delivery system 120, discussed in more detail below with regard to FIGS. 6-8. A content delivery system 120 may receive requests for content from multiple content consumption devices 105. A content delivery system 120 may, in some embodiments, dynamically generate a content manifest to be sent to a requesting device. A content delivery system 120 may also respond to requests for content based on the content manifest with the requested content. In some embodiments, a content delivery system may implement various streaming servers to deliver the requested content.

Various content consumption devices 150a-150n may be a variety of different devices, such as a desktop computer, mobile phone, personal digital assistant (PDA), laptop computer, tablet computer, or other electronic device, such as described below with regard to FIG. 9. These devices may also implement content consumption platforms. Content consumption platforms may be software or hardware implementations of devices or applications to consume content.

Consuming content may be otherwise described as processing, playing, viewing, or projecting the content. As previously described, content may be any form of distributable media such as audio, video, documents, or applications, and, therefore, consuming the media may correspond to the various ways the particular media is used. For example, consuming video content may be to display, record, or edit the video content. Multiple content consumption platforms may be implemented on a particular content consumption device. Additionally, some content consumption platforms may consume more than one type, format, size, bitrate, and/or resolution of content. For example, a content consumption device may implement one video player that may play Flash® video content and one video player that may play HTTP Live Streaming content.

Content consumption devices 150 may, in various embodiments, request content from a content management service 102. These devices may communicate over one or more wired or wireless networks, such as wide area network 100, with a content management service 102 to request and receive content and/or information. In some embodiments, a content consumption device 150 may be directed to request content from the content management service 102 by a network-based site 140. Network-based site 140 may be, for example, a network-based site that directs the content consumption device 150 via a network-based address link generated by a content management service 102.

In some embodiments, a content management service may be implemented in conjunction with a digital rights management service. For example, content request handling server 230 may also authenticate the right of a requesting content consumption device to consume the requested content before responding with a content manifest. In another example, a system, server, or other computing device may verify the access rights of a content consumption device before, during, or after receiving the requested content. In some embodiments the requested content may be encrypted and only consumable by a content consumption device that has received decryption information from a digital rights management system.

Figure 2:
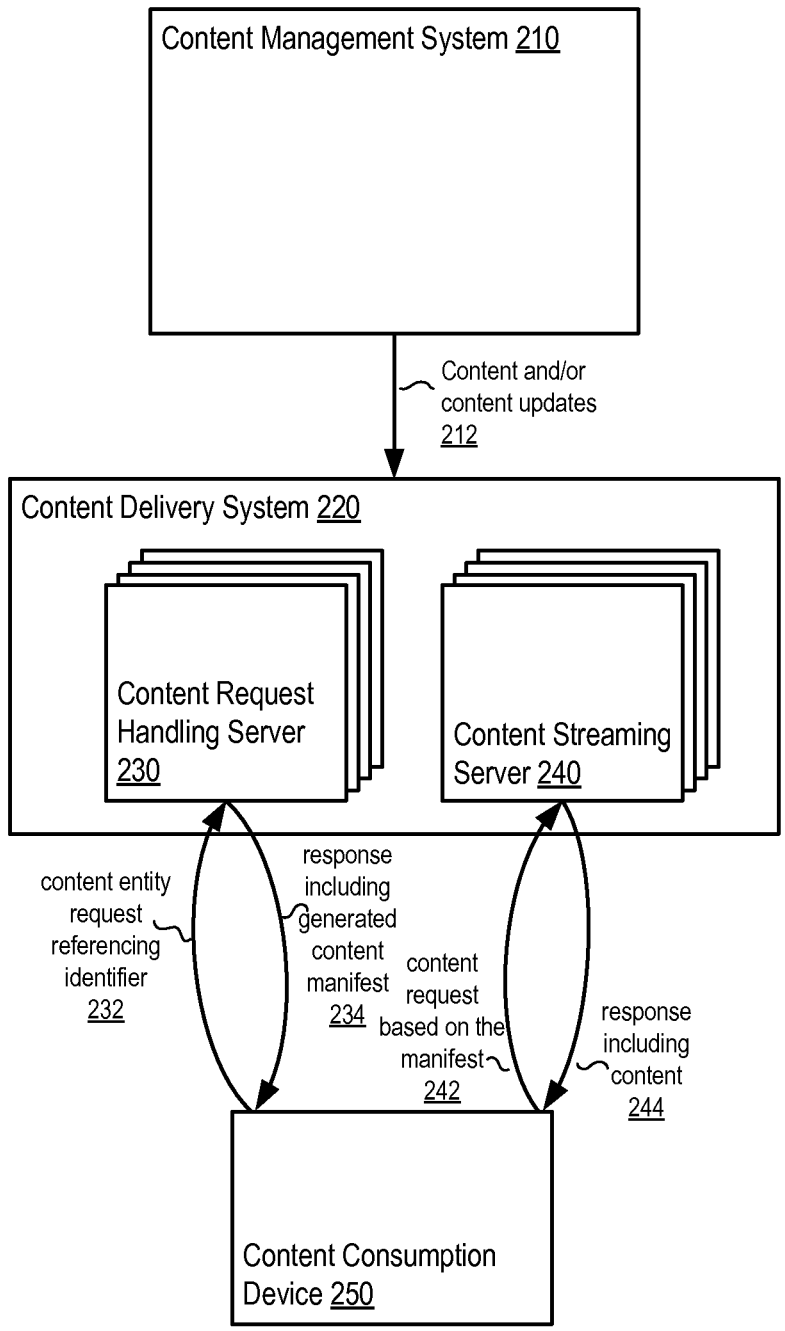
FIG. 2 illustrates a content management service, according to some embodiments.

FIG. 2 illustrates a content management service communicating with a content consumption device, according to some embodiments. As discussed above, a content management system 210 may publish content and/or content updates 212 to a content delivery system 220. A content delivery system 220 may include a content request handling server 230. In some embodiments a network of content request handling servers may be used with a load balancer to direct content requests to the appropriate content request handling servers. A content consumption device 250 may direct a content entity request referencing a content entity identifier 232 to a content request handling server 230. In response, a content request handling server 230 may dynamically generate a content manifest and send a response including the generated content manifest 234. The generated content manifest may be used by the content consumption device 250 may then send a content request based on the manifest 242 to one or more content streaming servers 240. In some embodiments, multiple content streaming servers 240 may be implemented by a content delivery system 220 with each streaming server corresponding to a different content format. For example, one content streaming server may be dedicated to streaming the requested content via HTTP Live streaming, and another streaming server dedicated to streaming content via Flash® technologies. In response to a request for content, a streaming server 240 may send a response including the requested content 244 to the requesting content consumption device 250.

Content Management System

Figure 3:
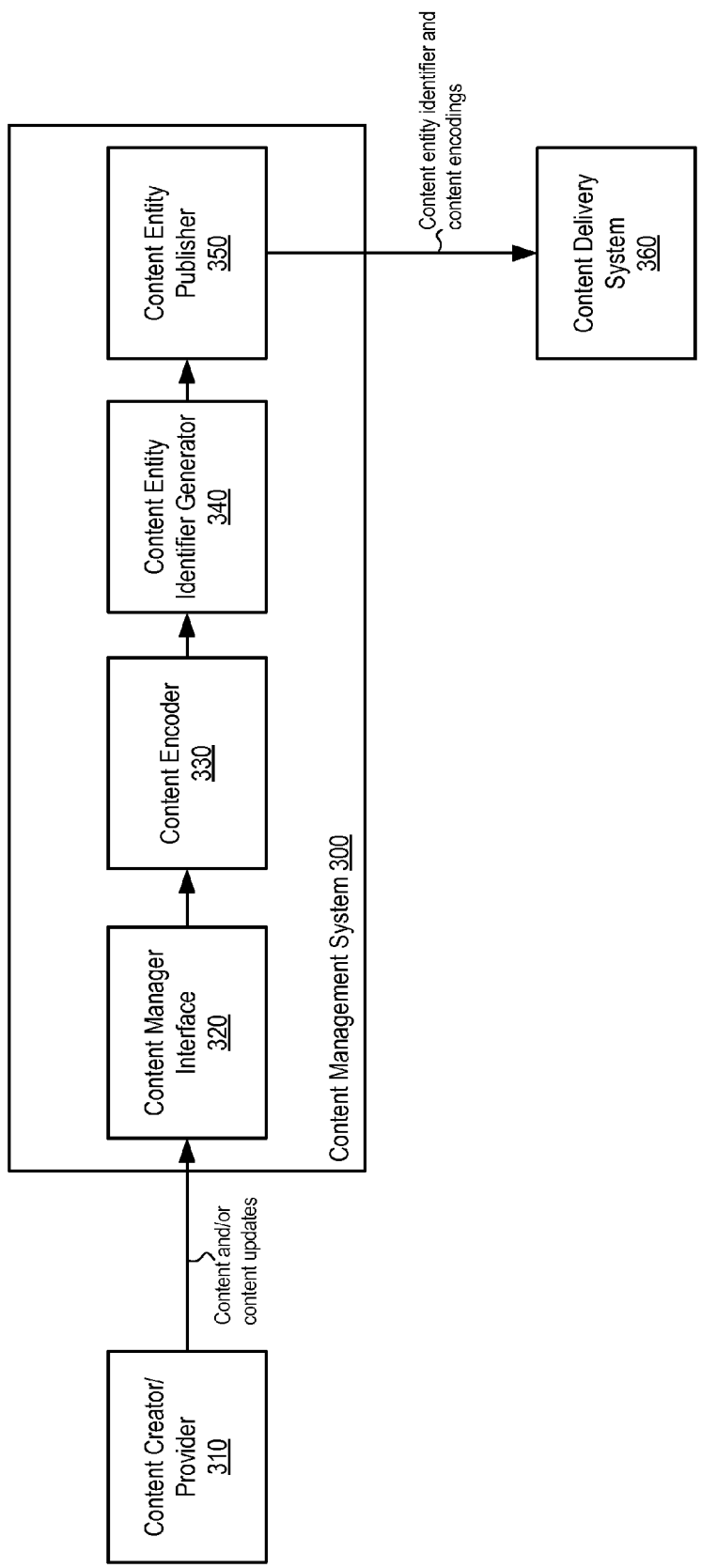
FIG. 3 illustrates a content management system, according to some embodiments.

A content management service, such as content management service 102 depicted in FIG. 1, may implement a content management system 110 or other form of digital asset management. A content management system, as discussed above, may receive master content, updates, or changes to content from a content creator/provider. FIG. 3 illustrates a content management system, according to some embodiments.

A content management system 300 may receive content and/or content updates from a content creator/provider 310. This content may be referred to as master content. Master content may be the original content created or produced by the content creator/provider 310 uploaded to the content management system 300 and from which the content management system 300 may generate bitrate encodings. A content management system 300 may receive content and/or content updates through a content manger interface 320. As discussed above, the content manager interface 320 may be implemented as network-based user interface. For example, in some embodiments a content creator/provider 310 may access the content management system 300 via a website interface. In other embodiments, a content creator/provider client device 310 may implement client-based user interface to communicate with the content manager interface 320.

A content creator/provider client device 310 may provide identity information to a content manager interface 320 in order access previously stored content or to upload new content to a content management service account. In some embodiments, a content management service may allow for multiple forms of user identification or other identification from multiple users to access a single content management service account. A content manager interface 320 may interact with other components (not picture in FIG. 3) to verify user identification information.

The content manager interface 320 may also allow for various user content management service account settings or preferences to be selected or changed via the content manager interface 320. Some embodiments of the content manager interface 320 may allow a user to receive input specifying one or more particular encodings to be generated for content. These encodings may be identified and selected individually, or by groupings, such as content consumption platform, format, resolution, size or file type. For example, encodings may be selected to generate MP4 or Flash® encodings, or particular devices may be selected, such as encodings for desktop, mobile phone, or tablet computer consumption. These encoding settings may be saved as a template that is automatically used to direct a content encoder 330 upon master content upload, or may be selected to generate the specified encodings of the master content based on, or in response to, user input.

In some embodiments, the content manager interface 320 may allow a content creator/provider client device 310 access to multiple master content items stored in a content management service. For example, in the earlier example discussed with regard to FIG. 1, an e-commerce merchant may store product videos for many of the products displayed on the e-commerce network-based site. A content manager interface 320 may provide a client device of the e-commerce merchant access to various interfaces to manage, change, or update the different stored product videos.

In at least some embodiments, the content manager interface 320 may provide a network-based address link (e.g., a URL) to a network-based site. This network-based link address may be placed by a content creator/provider client device 130 on a network-based site, such as network-based site 140 described with regard to FIG. 1, in order to direct requests for content to the content management delivery system 120. In some embodiments, a user interface of the content manager interface 320 may provide various mechanisms to obtain the network-based address, such as displaying the text of the address link, providing a copy function, or sending the link to a content creator/provider client device 310.

Whether master content has been recently uploaded by a content creator/provider 310, or is currently stored in a content management service, a content encoder 330 may generate multiple bitrate encodings of the received master content. These encodings may be for various different content consumption platforms, formats, bitrates, sizes, and resolutions. A content encoder 330 is generally a component that transforms the received master content into many different bitrate encodings of the received master content. Generally, the master content given to the content encoder may be of a higher quality (however this may be defined for a particular media, e.g., resolution for video content). Content encoders for different content types are well-known to those of ordinary skill in the art and may be implemented through a variety of hardware and software devices. For example, video codecs can be used to generate various encodings of video content. A video codec may employ MPEG-4 (also known as MP4) or Flash compression techniques to generate .mp4 and .f4v encodings. Similarly an audio codec may employ MPEG-1 or MPEG-2 Audio Layer III compression or WAV formats to generate .mp3 and .wav encodings. A content encoder 330 may also be used to generate an adaptive bitrate set from master content, which is a set of bitrate encodings used to perform adaptive bitrate streaming (discussed further below with regard to FIG. 6). Numerous other encoding formats, techniques, and devices are contemplated for various forms of current and developing distributable media. As such, the previous examples are not to be construed as limiting.

Encodings may be generated automatically by the content encoder 330 upon receipt of master content from a content creator/provider 310 with the selection specific encodings to be generated supplied to the content encoder 330 by previously defined settings or a template, such as discussed above. In some embodiments, the content manager interface 320 may receive user input selecting specific encodings of master content which the content encoder 330 may then use to generate the user selected encodings of the master content.

A content entity identifier generator 340 may, in some embodiments, create a single content entity identifier to identify the generated encodings of master content as a single content entity. A single content entity may be the set of encodings generated from particular master content. A single content entity identifier may be a data structure, record, index or listing used to identify the bitrate encodings included in a single content entity. For example, in some embodiments a database may record information for the various bitrate encodings generated and stored in a content management service. For all encodings included in a content entity, the same content entity record identifier may be referenced by each encoding included in the set of encodings of the content entity. Numerous other possible implementations of creating a content set identifier may be contemplated, as a variety of methods and techniques for set associations are well-known to those of ordinary skill in the art.

Continuing with the e-commerce site example, the e-commerce merchant may wish to add product videos for multiple new products to be offered on the e-commerce network-based site. As a content creator/provider, the e-commerce merchant may upload each additional product video to the content management service. The e-commerce merchant may have previously specified encoding settings for the content encoder 330 via the content management interface 320 to generate multi-bitrate sets with multiple bitrates for both MPEG-4 and Flash® video formats for tablet computers, mobile phones, and desktop computers. Rather than manually creating each video encoding, the e-commerce merchant's template may provide input to the content encoder 330 to generate the specified encodings of uploaded product videos. The content entity identifier generator 340 may create a content entity identifier that identifies the encodings included for each product video as a single content entity. As discussed previously, many of these product videos may now be identified as content entities so that when the e-commerce merchant accesses the product videos stored in the content management service to update or change a particular product video, all of the associated encodings of the product video as identified by the product video's content entity identifier may be updated or changed accordingly.

When a content manager interface 320 receives new, updated, or changed content for a particular content entity from a creator/provider client device 310, the content entity identifier generator 340 may generate a new content entity identifier, or update or change the content entity identifier to reflect the changes to the content entity. Additionally, in some embodiments, a content manager interface 320 may provide interface mechanisms to select various encodings and group them together, creating for the selected encodings a content entity identifier using the content entity identifier generator 340. For instance, using the previous example the e-commerce merchant may wish to add content encodings for a particular product video that support a new content consumption device or content consumption platform, format, or even simply to add a higher resolution video. Upon accessing the content management system 300 via the content management interface 320, one or more of the newly desired encodings may be uploaded to the content management service, or selected via the content management interface 320 and generated using the content encoder 330. The content entity identifier generator 340 may receive input to update the content entity identifier to include the newly added encodings, for example by adding a reference to the content entity identifier for the particular product video in the encoding database.

In various embodiments, a content entity publisher 350 may publish a content entity to a content delivery system 360. In at least some embodiments, the content entity is published without a content manifest. The content entity publisher 350 may automatically publish the content entity in response to received updates or changes to the content entity. A network-based or other user interface may allow a content creator/provider to select or specify content entity publisher 350 settings, such as the timing of when automatic updates are applied (e.g., every Friday, every 12 hours, etc. . . . ), or whether to immediately republish content entities to the content delivery system 360. Further continuing the e-commerce example, any updates or changes (such as additions to or deletions from a content entity) to a product video may be automatically published to the content delivery system 360. Alternatively, if the e-commerce merchant wishes to release updated product videos for a batch of products simultaneously, the content entity publisher settings may be specified to publish the updated content entities at a specific date and time.

A content entity publisher 350 may publish a content entity to multiple subsystems, servers, or computing devices within a content delivery system 360. A content entity publisher 350 may, in some embodiments, send to a content request handling server, described below with regard to FIG. 6, an index or other listing of the different bitrate encodings that are mapped to a content entity identifier. Similarly, content entity metadata information, such as encoding format, encoding bitrate, and encoding size may be sent to data storage accessible to a content request handling server. The encodings themselves may be sent to multiple content streaming servers. In at least some embodiments, as discussed above, each content streaming server may implement streaming a particular content format.

Content Management Workflow

Figure 4:
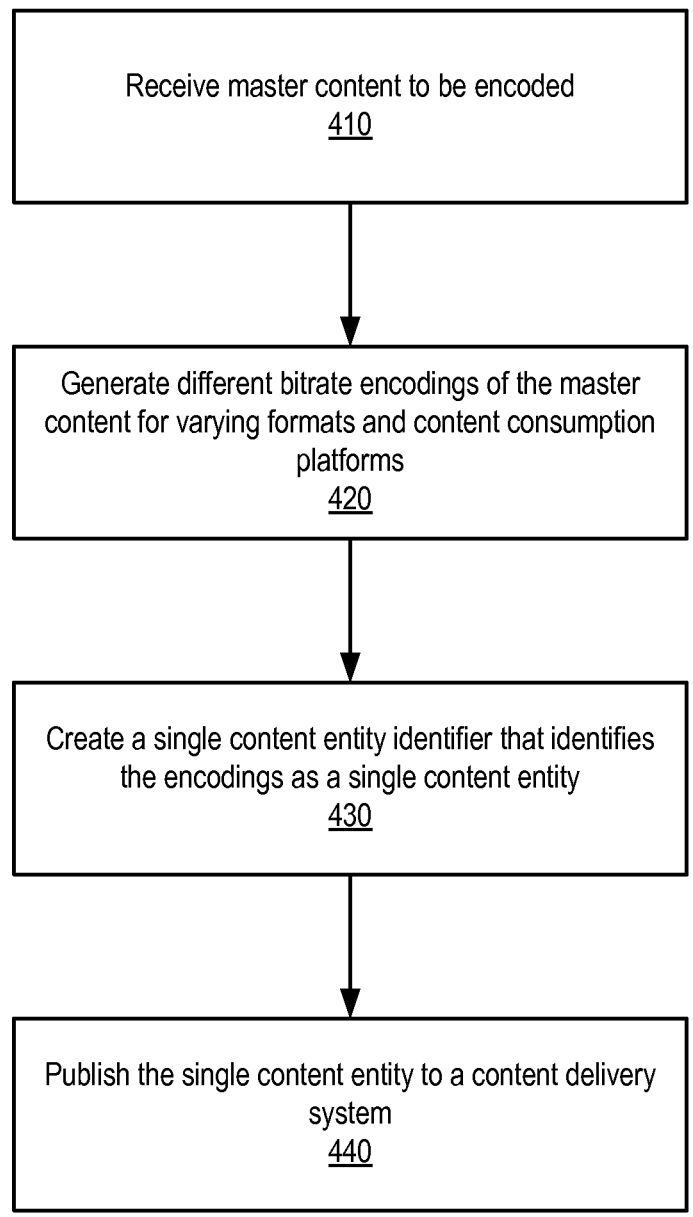
FIG. 4 illustrates a workflow of a method to generate a single content entity from multiple encodings of received master content, according to some embodiments.

There are numerous possible embodiments of generating a single content entity to manage multiple bitrate encodings for multiple content consumption platforms. The system illustrated in FIG. 3 is one of such possible embodiments. FIG. 4, however, outlines the workflow of a method for generating a single content entity to manage multiple bitrate encodings for multiple content consumption platforms which may be implemented in systems similar to the content management system outlined in FIG. 3 or into other implementations of a content management service, such as content management service 102 as described in FIG. 1. Program instructions executable by a computing device performing the method outlined in FIG. 4 may be stored in a non-transitory computer-readable storage medium.

In some embodiments, a content management system may receive master content to be encoded 410. Master content, as described above with regard to FIG. 1, may be generally any distributable form of media, such as audio, video, documents, or applications. This master content may be the original or highest quality version of content from which a content management system may generate bitrate encodings. File Transfer Protocol (FTP), Hypertext Transfer Protocol (HTTP), or many other well-known communication methods or channels may be utilized by a content management system to receive master content. Master content may be uploaded via a content management interface, such as content management interface 320 described in FIG. 3.

A content management system may then generate different bitrate encodings of the received master content for a variety of formats for different content consumption platforms 420. Bitrate encodings may differ based on format for a content consumption platform (e.g., MP4 or F4V for different video content consumption platforms, MP3 or AAC for audio for different audio consumption platforms). Other differences between bitrate encodings may be the bitrate (e.g. 600 kbps, 800 kbps, or 2000 kbps) or size (e.g., dimensions for video content such as 512×288 pixels, 640× 360 pixels, or 1270×720 pixels). The different bitrate encodings may be generated based on receiving input specifying encodings based on format, bitrate, size or other groupings such as encodings consumable by a mobile phone, a tablet computer, or a laptop computer. In some embodiments, the content management system through a content management interface, such as interface 320 discussed above with regard to FIG. 3, may obtain, direct, or otherwise define the number and/or type of these different bitrate encodings generated. Some embodiments may only generate different bitrate encodings of the master content, and thus not generate a redundant or the same bitrate encoding for a particular master content.

Various embodiments of a content management system may then create a single content entity identifier that identifies the bitrate encodings as a single content entity 430. This single content entity may be used in the content management system to manage (e.g., update or change) specific content encodings, or the entire set of encodings of the content entity. The content entity identifier may, as discussed above with regard to FIG. 3, be any form of data structure, record, index, listing implemented using a variety of well-known software and hardware techniques and devices used to identify the bitrate encodings included in a single content entity. For example, in some embodiments a database may maintain a record entry for each encoding stored in the content management service. The content entity identifier may be referenced in each record of each encoding included the content entity. In some embodiments, the single content entity identifier may include information that identifies a particular template used to generate a particular set of bitrate encodings, such as the template discussed above with regard to the content encoder 330 in FIG. 3. If a change is made to the template, such as adding or removing an encoding (e.g., adding a different encoding size), then the single content entities generated based upon the changed template may be easily identified.

A content management system may then, in some embodiments, publish the content entity to a content delivery system 440. Publishing may be any form of sending, transporting, or communicating the content entity to the content delivery system. In some embodiments, publish the content entity to a content delivery system may include sending an index or other listing of the content entity as identified by the content entity identifier to a content request handling server (discussed below with regard to FIG. 6) and may include sending to one or more streaming servers (discussed below with regard to FIG. 6) the different bitrate encodings. Publishing may occur automatically (e.g., such as in accordance with user specified publishing settings for date and time or in response to an update of a content entity).

Figure 5:
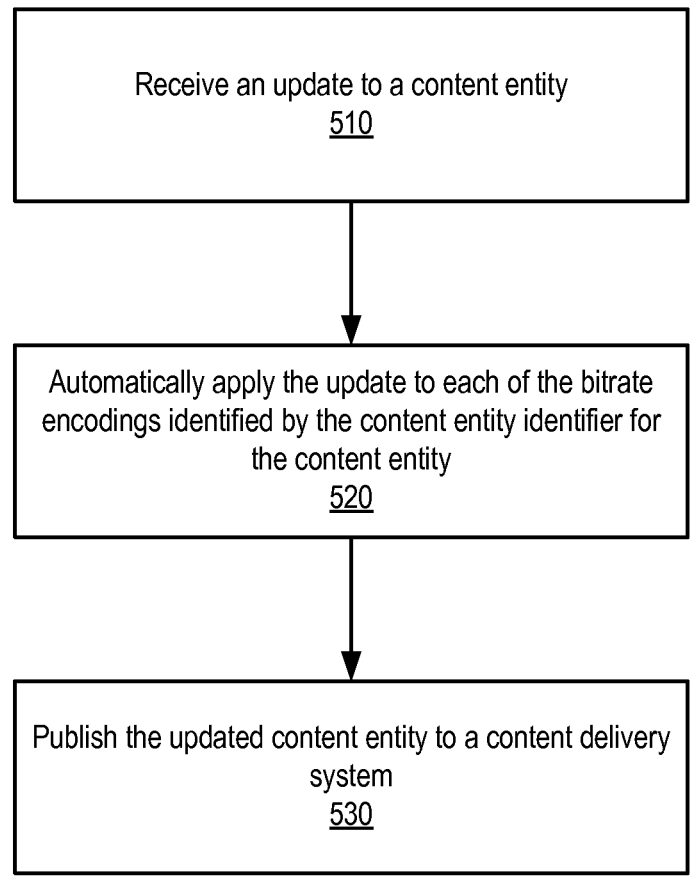
FIG. 5 illustrates a workflow of a method to update encodings included in a single content entity, according to some embodiments.

In some embodiments, a content management system may allow for one or more updates to a content entity. FIG. 5 outlines the workflow of a method to update encodings included in a single content entity, according to some embodiments. This method may be implemented by content management system as described in FIG. 3 or more generally by a content management service as described in FIG. 1.

A content management system may receive one or more updates to a content entity 510. A content management interface, such as described at 320 in FIG. 3, may be implemented to specify and receive these updates. An update may, for example, be to modify the length of master video content, such as by shortening it. Another form of update may be to add or delete particular encodings from the content entity. Numerous other types of updates for a content entity may be received, and therefore the above examples of updates are not to be construed as limiting.

In response to receiving an update, a content management system may automatically apply the update to each of the bitrate encodings identified by the content entity identifier for the content entity 520. Applying an update, in some embodiments, may leave some of the encodings of content entity unchanged. For example, if an update is to add a new encoding to the content entity, then the content entity identifier will reflect the addition of the new encoding to be identified as included in the content entity, and no other change may be made to the other identified content entity encodings. However, if a change is made to the master content of the content entity, such as shortening the length of the content, then a content management system may apply the update to all of the identified encodings, as each encoding of the content entity is affected. In various embodiments, the type of update or change to the content entity may determine which particular encodings of the content entity are to be changed. In some embodiments, these updates may be applied manually instead of automatically.

Once the updates are applied, a content management system may publish the updated content to a content delivery system 530. As discussed previously, publishing may occur automatically after applying the update (e.g., such as immediately, or in accordance with previously user specified publishing settings for date and time).

Content Delivery System

As described above with regard to FIGS. 1 and 2, a content delivery system, as depicted at 120 and 220, may in various embodiments, distribute various forms or encodings of content to one or more requesting content consumption devices. FIG. 6 describes in further detail a content delivery system 610, according to some embodiments. In some embodiments, such as depicted in FIG. 6, a content delivery system may include multiple computing devices, such as the content request handling server 620 and the content streaming server 630. In at least some embodiments, multiple streaming servers may be utilized. Multiple content request handling servers may also be networked together with requests for content being distributed among the servers by a load balancer. However, various embodiments and methods of generating a single content entity to manage multiple bitrate encodings for multiple content consumption platforms may be implemented in various other ways (e.g., combining the content request handling server 620 and the content streaming server 630 onto one server), and therefore FIG. 6 is not intended to be limiting.

As discussed previously with regard to FIGS. 3 to 5, a content management system 600 publishes a content entity to a content delivery system such that a content delivery system 610 may receive from a content management system 600 content, content information, or content updates. A content entity request handling server may be implemented on a computer, such as the computer system 1000 described below with regard to FIG. 9. In some embodiments, publishing a content entity to a content delivery system 610 may include receiving multiple bitrate encodings of content that are linked to a single content entity identifier. In at least some embodiments, a content management system 600 may send an index of the different bitrate encodings included in a content entity mapped to the content entity identifier of the content entity to a content request handling server 620.

In some embodiments, the content request handling server 620 may implement a content entity metadata storage 622 to store any received index of bitrate encodings or other metadata for bitrate encodings for a content entity. Content entity metadata storage 622 may be implemented by a physical storage device, such as data storage 1035 in FIG. 9. Alternatively in some embodiments the content entity metadata storage may be implemented external to the content delivery system 610 on another storage system, such as a database system. Instead of accessing the locally stored content entity metadata, this external storage system may be communicated with by one or more components of a content request handling server 620, such as the content manifest generator 626 or the content request manager 624.

Content entity metadata may include the encoding format, bitrate, and size for each bitrate encoding. For example, three bitrate encodings for a single video content entity may have the following metadata entries:

| Filename | Format | Dimensions | Bitrate |
| --- | --- | --- | --- |
| video_1 | MP4 | 512 × 288 | 657 kbps |
| video_2 | MP4 | 640 × 360 | 873 kbps |
| video_3 | MP4 | 1280 × 720 | 2121 kbps |

In this example, the format is MP4, which may be displayed on content consumption platforms capable of processing an MP4. The dimension information is a form of size metadata and the bitrate displays the quality or amount of the data in the content. Other forms and/or types of content entity metadata for encodings may be stored dependent on the type of content (e.g., audio, video, etc.).

As discussed above with regard to FIGS. 1 and 2, a content delivery system (or a content management service) may store multiple content entities. A content consumption device 640 may be directed by another system, such as a network-based site 140 in FIG. 1, to request one of these content entities for consumption. In some embodiments, a content delivery system 610 may receive a request referencing a content entity identifier 642 along with format information for the content consumption platform of the requesting content consumption device 640 at a content request handling server 620. In some embodiments, a content request handling server 620 may implement a content request manager 624, through hardware, software, or a combination thereof to process or otherwise handle requests from a content consumption device 640.

The request for a content entity may be transmitted over one of the various communication channels discussed in FIG. 1. In some embodiments, the request for a content entity may be made using the HTTP protocol. For example, an HTTP video content entity request may look like:

http://example.com/request_server/
exampleVideoSet?req=mbrSet&fmt=f4m

The request is directed to the address "example.com" and the "request_server." The content entity references the content entity identifier "exampleVideoSet." Also included in the request is a request for encodings of a particular format "req=mbrSet&fmt=f4m." A content request manager 624 may parse the http request to identify and extract the requested content entity identifier as well as the format information. Alternatively, in some embodiments a content request manager 624 may receive an http request that ends in a format (e.g., ".m3u8" for an MP4 request), such as:

http://example.com/request_server/
exampleVideoSet.m3u8

The content request manager 624 may parse the http request to identify the requested file and format information to automatically map the request to the content entity. For example, a content request manager 624 may implement one or more macro functions to generate further information to include with the original http request, such as appending:

?req=mbrSet&fmt=m3u8 to the original request.

In response to receiving a request from content consumption device 640, a content request manager 624 may determine a format for the content consumption platform based on the format information in the request. The determined format may be communicated to the content manifest generator 626. A content manifest generator 626 may be implemented, in some embodiments, as a component of a content request handling server 620 through various hardware and/or software techniques and devices. The content manifest generator 626 may dynamically generate a content manifest for the requesting content consumption device 640. A content manifest may be a subset of the bitrate encodings linked to a content entity via the content entity identifier. In some embodiments, to generate the content manifest, a content manifest generator 626 may access the stored metadata for encodings in the content entity metadata storage 622. Based on the stored metadata, the content manifest generator 626 may select encodings to include in the content manifest. Various methods and techniques may be used to dynamically generate a content manifest and are discussed below with regard to FIGS. 7 and 8. A content manifest generator 626 may obtain various other specifications and arguments as input from the content consumption device request 642, such as a request for a particular bitrate or size.

Content manifests themselves may be formatted or structure according to techniques and devices well-known to those or ordinary skill in the art. For example, in response to the example HTTP request from above, a content manifest generator 626 may create an XML response:

```
<manifest xmlns="http://ns.adobe.com/f4m/2.0">
  <media
  href="http://example.com/streaming_server/exampleVideo/example
  Video_150kbps.f4v.f4m" bitrate="150" />
  <media href="http://
  example.com/streaming_server/exampleVideo/example
  Video_500kbps.f4v.f4m" bitrate="500" />
  <media href="http://
  example.com/streaming_server/exampleVideo/example
  Video_700kbps.f4v.f4m" bitrate="700" />
  <media href="http://
  example.com/streaming_server/exampleVideo/example
  Video_1000kbps.f4v.f4m" bitrate="1000" />
  <media href="http://
  example.com/streaming_server/exampleVideo/example
  Video_1500kbps.f4v.f4m" bitrate="1500" />
</manifest>
```

A content manifest generator 626 may also generate a plain text response. A content manifest generator 626 may also use common manifest file formats such as .mu38 or .f4m. However, none of the above examples are intended to be limiting as to the various formats for constructing content manifest files.

The content request manager 624 may obtain from the content manifest generator 626 the dynamically generated content manifest. The content request manager may then send the response including the content manifest 644 to the requesting content consumption device 640. The content consumption device 640 may use the content manifest to request content from a content streaming server 630.

A content delivery system 610 may include one or more content streaming servers 630. These streaming servers 630 may, in some embodiments, be configured to stream content according to particular streaming technologies. For example, to stream video content, a content delivery system 610 may implement a content streaming server configured to stream video content according to HTTP live streaming and a content streaming server configured to stream video content according to Flash® technology. Various other formats and streaming technologies are well-known to those of ordinary skill in the art and the above example technologies are not intended to be limiting. A content streaming server 630 may implement content entity storage 632 which may be physical storage, such as data storage 1035 in FIG. 9, or some other form of storage system, internal or external to the content streaming server 630. Stored within the content entity storage 630 may be bitrate encodings linked to a content entity. In various embodiments, a content streaming server 630 may receive these encodings from a content management system 600 which publishes the encodings to the appropriate streaming servers 630. For instance, if as in the prior example encodings for both Flash® and HTTP Live Streaming technologies are generated, a content management system 600 may publish the Flash® encodings to the streaming server 630 configured for Flash® streaming and the HTTP Live Streaming encodings to the streaming server 630 configured for HTTP Live Streaming.

A content streaming server 632 may receive a content request based on a dynamically generated manifest 646 from a content consumption device 640. A content streaming server 630 may implement a content streamer 634 through various hardware and/or software techniques and devices to handle content requests and stream the content. Generally, content streaming involves dividing content into small segments and transporting the segmented content using one of a variety of communication protocols, such as Real Time Messaging Protocol (RTMP) or HTTP. A content streamer 634 may obtain the particular requested encoding from content entity storage 632 and stream the content to the requesting content consumption device 640. In some embodiments, the content streamer 634 may implement adaptive streaming technologies which use multi-bitrate sets.

Generally, a multi-bitrate set may be a set of encodings of a particular content at various bitrates. The lower the bitrate, the lesser amount of content data to transport and process, though at the cost of lower quality content. Devices which implement adaptive streaming may vary content requests for different bitrates according to the capabilities of the device and the current transportation environment of the content. For example, if communication channels between a requesting device and a streaming server are congested, a device may request lower bitrate encodings to prevent disruption or failure of the content consumption. Multiple bitrates may allow for more finely tuned requests for content. For example if three bitrates for content exist, then a content device may not have to request a low bitrate (and therefore low quality) instead of a high bitrate, but may instead request a medium bitrate of the content. To determine what bitrate encodings are available to be request, a content consumption device may rely upon a content manifest file to provide the information to retrieve the various encodings in the multi-bitrate set.

In some embodiments, a content consumption device 640 and a content streamer 634 may be configured to provide adaptive streaming technology. Based on the dynamically generated content manifest, a content consumption device may request varying bitrate encodings of a content entity from the content streamer 634. The content streamer 634 may respond with the requested content 648.

Dynamically Generating Content Manifests

There are numerous possible embodiments of delivering content to content consumption devices. The system illustrated in FIG. 6 is one of such possible embodiments. FIG. 7, however, outlines the workflow of a method to dynamically generate a content manifest for a requesting content consumption platform which may be implemented in systems similar to the content delivery system outlined in FIG. 6 or into other implementations of a content management service, such as content management service 102 as described in FIG. 1. Program instructions executable by a computing device performing the method outlined in FIG. 7 may be stored in a non-transitory computer-readable storage medium.

A content delivery system may receive a request for a content entity identifier 710. The request may be communicated along a variety of communication channels, as discussed above with regard to FIG. 6, such as HTTP. The request may include format information, such as the example HTTP request shown above. Format information may also be detected through various other methods and techniques based on embedded information in the request. For example, device detection techniques, such as those used to detect whether a browser is running from a mobile phone/device or a desktop computer, may be used to determine format information.

Based on the format information in the request, a content delivery system may determine a particular format 720 for the content consumption platform of the content consumption device. In some embodiments, the determined format may be unknown, undetectable, or unavailable, for which a default format may be specified. Embodiments of a content delivery system may also return an error message to a requesting device if the format information is unknown or undetectable. Formats for content consumption platforms, as discussed above, may be the file, container, or encoding that may be processed and consumed by the content consumption platform. For instance, a video format may be F4V or MP4. Likewise, an audio format may be MP3, WAV, or AAC. Various other content formats, for the various types of content are discussed above with regard to FIG. 1, and therefore the previous examples are not intended to be limiting.

Based on the determined format, a content delivery system may dynamically generate a content manifest 730 for the requested content entity identifier. In some embodiments, this content manifest may be generated according to various other arguments or specifications in the received content entity request. For example, a video content entity request may, in addition to format information a request, also include dimension information. Other arguments may also further specify the encodings to be included in the content manifest. Likewise a content delivery system itself may also implement a variety of selection logic or schemas for including encodings in a content manifest. If, for example, no encodings exist in the content entity for the determined format, a default format or encodings may be used. In some embodiments, a content delivery system may choose, based on various well-known techniques, what encodings are most like the requested content encodings, if no encodings are complete match. For instance, a video content entity request may include a particular dimension 200×400, and a content delivery system may select to include encodings of 150×300 instead of 250×500 based on a scheme that always selects the next smallest available dimension.

Figure 8:
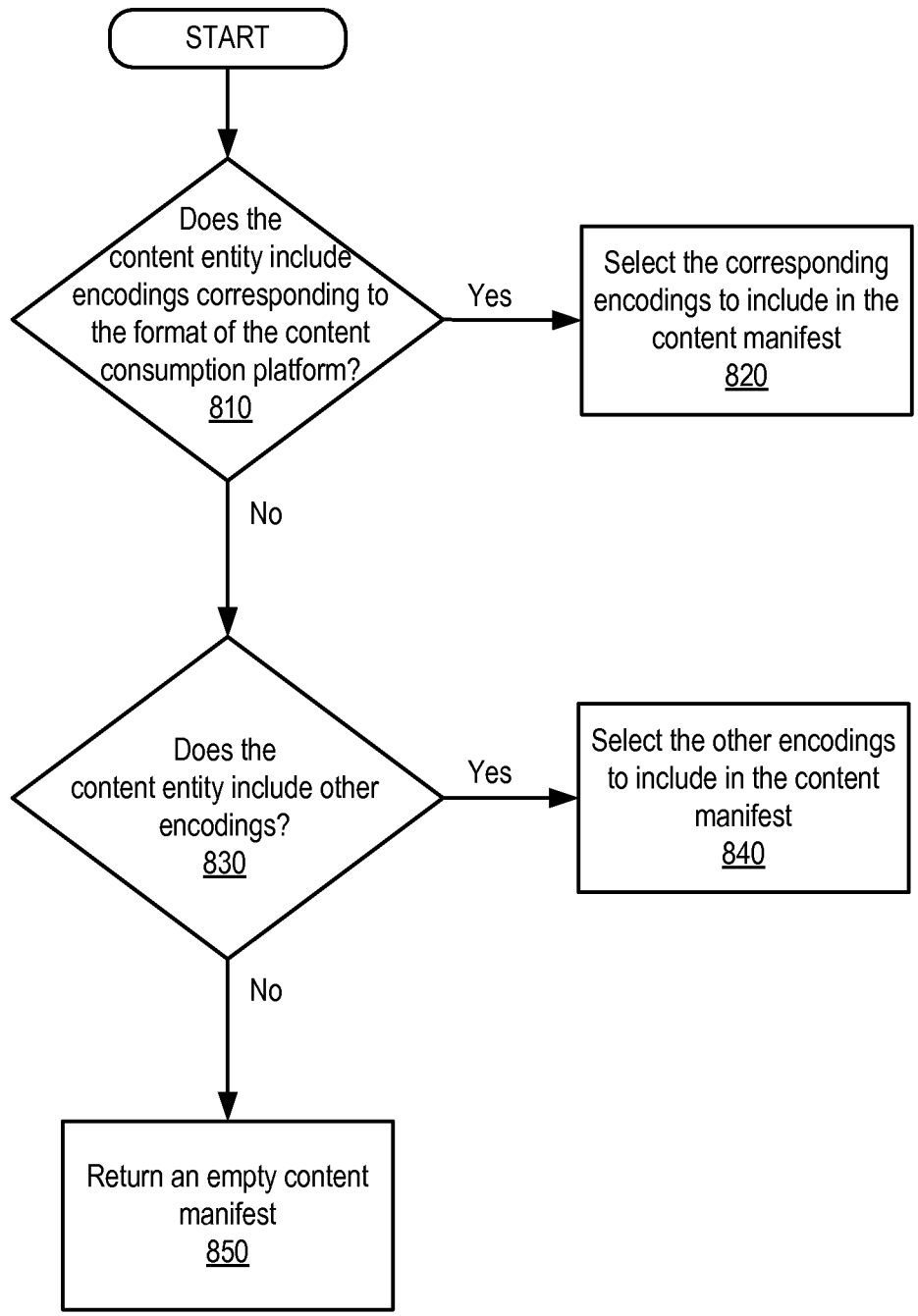
FIG. 8 illustrates a workflow of a method to select encodings to include in a dynamically generated manifest file, according to some embodiments.

FIG. 8 outlines a workflow of a method to select encodings to include in a dynamically generated manifest file, according to some embodiments. A content delivery system may determine whether the bitrate encodings identified by the requested content entity identifier correspond to the determined format of the content consumption platform 810. If any encodings do correspond, then, in some embodiments, only those corresponding encodings may be included in the content manifest 820. If none correspond, then a content delivery system may determine if any other bitrate encodings are identified by the requested content entity identifier 830. If any other bitrate encodings exist, then a content delivery system may select those encodings to include in the content manifest 840. If no encodings are identified for the requested content entity identifier, some embodiments may generate and return an empty content manifest 850. In some other embodiments, an error message may be returned. The steps illustrated in FIG. 8 are not intended to be limiting, whether to ordering or performance. Some parts or all of the steps may be performed in various embodiments, as well as additional steps or methods, such as those other logic rules and schemas discussed above.

Once generated, a content delivery system may send the generated content manifest to the requesting content consumption platform 740. In some embodiments the response may contain additional information or messages, such as error or warning messages.

Example System

Embodiments of generating a single content entity to manage multiple bitrate encodings for multiple content consumption platforms as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or stereoscopic display systems or devices. In at least some implementations, the input/output devices 1050 may also include a touch- or multi-touch enabled device 1090 such as a pad or tablet via which a user enters input via a stylus-type device and/or one or more digits, and/or a motion tracking device 1092 such as an smart phone or game controller with accelerometer/gyroscope technology, a space mouse, a visual tracking system, or an electromagnetic tracking system. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 2010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the stereo drawing techniques disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of generating a single content entity to manage multiple content encodings for multiple content consumption platforms as described herein are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement embodiments of generating a single content entity to manage multiple content encodings for multiple content consumption platforms as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the stereo drawing techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
performing, by a content management system on one or more computing devices:
receiving master content to be encoded;
retrieving a template based on the template corresponding to a content provider from which the received master content is received;
identifying a set of bitrates and file formats from the retrieved template;
generating a plurality of different bitrate encodings of the received master content for a plurality of different formats for different content consumption platforms, wherein the plurality of different bitrate encodings are generated based on the set of bitrates and file formats identified from the retrieved template;
creating a single content entity identifier subsequent to generating the plurality of different bitrate encodings, wherein the single content entity identifier is assigned to the generated plurality of different bitrate encodings to identify, as a single content entity, the generated plurality of different bitrate encodings;
publishing the single content entity to a content delivery system, the content delivery system storing each of the plurality of different bitrate encodings with a reference to the single content entity identifier such that, when the content delivery system is accessed for an update or change, all of the plurality of different bitrate encodings associated with the master content are identified by the single content entity identifier, and
updating the single content entity identifier to include a reference to the template.

2. The method of claim 1, further comprising:
receiving, at the content management system, an update to the single content entity; and
in response to receiving the update to the single content entity:
retrieving, by referencing the single content entity identifier, the plurality of different bitrate encodings as the single content entity;
automatically applying, via the content management system, the received update to each of the bitrate encodings identified by the single content entity identifier for the single content entity; and
publishing via the content management system the updated single content entity to the content delivery system.

3. The method of claim 1, further comprising:
generating a network-based address link including a reference to the single content entity; and
providing the generated network-based address link to a page for a network-based site.

4. The method of claim 1, further comprising:
wherein said publishing comprises publishing the single content entity to a content delivery system without a content manifest for each different format;
wherein a manifest corresponding to the published single content entity is dynamically generated by a content request handling server performing, in response to a request from a content consumption platform, operations comprising:
identifying the single content entity using the single content entity identifier,
selecting a subset of different bitrate encodings from the generated plurality of different bitrate encodings based on the subset of different bitrate encodings having one or more file formats indicated by the request,
excluding other different bitrate encodings from the generated plurality of different bitrate encodings based on the other different bitrate encodings lacking the one or more file formats indicated by the request, and
adding the subset of different bitrate encodings to the manifest, and
wherein said generated manifest identifying the subset of different bitrate encodings is sent to the content consumption platform.

5. The method of claim 4, wherein the operations further comprise determining, prior to selecting the subset of different bitrate encodings, that an initial subset of different bitrate encodings from the generated plurality of different bitrate encodings (i) includes one or more particular bitrates indicated by the request and (ii) lacks one or more file formats indicated by the request, wherein the subset of different bitrate encodings lacks the one or more particular bitrates and is selected as a replacement for the initial subset of different bitrate encodings.

6. The method of claim 1, wherein said publishing the single content entity to a content delivery system comprises:
sending to a content request handling server an index of the plurality of different bitrate encodings mapped to the single content entity identifier; and
sending to one or more content streaming servers the plurality of different bitrate encodings.

7. The method of claim 1, further comprising:
detecting, by the content management system, a change to the template;
selecting, by the content management system and based on detecting the change, the single content entity identifier by matching the template to the reference to the template; and
updating, in accordance with the change to the template, one or more bitrate encodings included as part of the single content entity.

8. A system comprising:
a processing device; and
a non-transitory computer-readable storage medium storing program instructions, wherein the processing device is configured to execute the program instructions to implement a content management system by performing operations comprising:
receiving master content to be encoded;
retrieving a template based on the template corresponding to a content provider from which the received master content is received;
identifying a set of bitrates and file formats from the retrieved template;
generating a plurality of different bitrate encodings of the received master content for a plurality of different formats for different content consumption platforms, wherein the plurality of different bitrate encodings are generated based on the set of bitrates and file formats identified from the retrieved template;
creating a single content entity identifier subsequent to generating the plurality of different bitrate encodings, wherein the single content entity identifier is assigned to the generated plurality of different bitrate encodings to identify, as a single content entity, the generated plurality of different bitrate encodings;
publishing the single content entity to a content delivery system, the content delivery system storing each of the plurality of different bitrate encodings with a reference to the single content entity identifier such that, when the content delivery system is accessed for an update or change, all of the plurality of different bitrate encodings associated with the master content are identified by the single content entity identifier; and
updating the single content entity identifier to include a reference to the template.

9. The system of claim 8, wherein the operations further comprise:
receiving an update to the single content entity; and
in response to receiving the update to the single content entity:
automatically applying the received update to each of the bitrate encodings identified by the single content entity identifier for the single content entity; and
publishing the single content entity, as updated, to the content delivery system.

10. The system of claim 8, wherein, in said generating a plurality of different bitrate encodings of the received master content, the operations further comprise:
receiving input specifying one or more particular encodings for a particular format for a particular content consumption platform; and
encoding the content to generate the specified encodings.

11. The system of claim 8, wherein the operations further comprise:
generating a network-based address link including a reference to the single content entity; and
providing the generated network-based address link to a page for a network-based site.

12. The system of claim 8, wherein the operations further comprise:
in said publishing the single content entity to a content delivery system, publishing the single content entity to a content delivery system without a content manifest for each different format;
wherein the system further comprises a content request handling server of the content delivery system, the content request handling server configured for:
dynamically generating a manifest corresponding to the published single content entity, in response to a request from a content consumption platform, manifest-generation operations comprising:
identifying the single content entity using the single content entity identifier,
selecting a subset of different bitrate encodings from the generated plurality of different bitrate encodings based on the subset of different bitrate encodings having one or more file formats indicated by the request,
excluding other different bitrate encodings from the generated plurality of different bitrate encodings based on the other different bitrate encodings lacking the one or more file formats indicated by the request, and
adding the subset of different bitrate encodings to the manifest, and
transmitting the generated manifest identifying the subset of different bitrate encodings to the content consumption platform.

13. The system of claim 12, wherein the manifest-generation operations further comprise determining, prior to selecting the subset of different bitrate encodings, that an initial subset of different bitrate encodings from the generated plurality of different bitrate encodings (i) includes one or more particular bitrates indicated by the request and (ii) lacks one or more file formats indicated by the request, wherein the subset of different bitrate encodings lacks the one or more particular bitrates and is selected as a replacement for the initial subset of different bitrate encodings, wherein the subset of different bitrate encodings lacks the one or more particular bitrates and is selected as a replacement for the initial subset of different bitrate encodings.

14. The system of claim 8, wherein, in said publishing the single content entity to a content delivery system, the operations further comprise:
sending to a content request handling server an index of the plurality of different bitrate encodings mapped to the single content entity identifier; and
sending to one or more content streaming servers the plurality of different bitrate encodings.

15. The system of claim 8, the operations further comprising:
detecting a change to the template;
selecting, based on detecting the change, the single content entity identifier by matching the template to the reference to the template; and updating, in accordance with the change to the template, one or more bitrate encodings included as part of the single content entity.

16. A non-transitory computer-readable medium having program code executable by one or more processing devices to perform operations comprising:
receiving master content to be encoded;
retrieving a template based on the template corresponding to a content provider from which the received master content is received;
identifying a set of bitrates and file formats from the retrieved template;
generating a plurality of different bitrate encodings of the received master content for a plurality of different formats for different content consumption platforms, wherein the plurality of different bitrate encodings are generated based on the set of bitrates and file formats identified from the retrieved template;
creating a single content entity identifier subsequent to generating the plurality of different bitrate encodings, wherein the single content entity identifier is assigned to the generated plurality of different bitrate encodings to identify, as a single content entity, the generated plurality of different bitrate encodings;
publishing the single content entity to a content delivery system, the content delivery system storing each of the plurality of different bitrate encodings with a reference to the single content entity identifier such that, when the content delivery system is accessed for an update or change, all of the plurality of different bitrate encodings associated with the master content are identified by the single content entity identifier; and
updating the single content entity identifier to include a reference to the template.

17. The non-transitory computer-readable medium of claim 16, the operations further comprising:
detecting a change to the template;
selecting, based on detecting the change, the single content entity identifier by matching the template to the reference to the template; and
updating, in accordance with the change to the template, one or more bitrate encodings included as part of the single content entity.

* * * * *